United States Patent

Cazaillon et al.

[11] Patent Number: 5,173,226
[45] Date of Patent: Dec. 22, 1992

[54] PROCESS OF MANUFACTURING AN INJECTED SKI

[75] Inventors: Jean-Mary Cazaillon, Cran Gevrier; Bernard Chatellard, Veyrier du Lac, both of France

[73] Assignee: Salomon S.A., Annecy Cedex, France

[21] Appl. No.: 608,648

[22] Filed: Oct. 31, 1990

[30] Foreign Application Priority Data

Nov. 22, 1989 [FR] France ................. 89 15664

[51] Int. Cl.⁵ ............................................. B29C 67/22
[52] U.S. Cl. ..................... 264/46.6; 264/46.4; 264/46.7; 264/257
[58] Field of Search ............... 280/610; 156/79, 309.6; 441/68, 74; 264/46.5, 46.6, 257, 46.4, 46.7

[56] References Cited

U.S. PATENT DOCUMENTS

| | | | |
|---|---|---|---|
| 3,503,621 | 3/1970 | Schmidt et al. | 280/610 |
| 3,816,573 | 6/1974 | Hashimoto et al. | 280/610 |
| 3,879,245 | 4/1975 | Fetherston et al. | 264/321 |
| 4,044,083 | 8/1977 | Howe et al. | 264/46.5 |
| 4,259,274 | 3/1981 | Tiitola | 264/46.5 |
| 4,386,982 | 6/1983 | Weinhaus | 264/46.5 |
| 4,457,729 | 7/1984 | Peerlkamp | 441/74 |
| 4,681,725 | 7/1987 | Maruyama | 264/46.5 |
| 4,698,258 | 10/1987 | Harkins, Jr. | 156/79 |
| 4,725,070 | 2/1988 | Maruyama | 280/610 |
| 4,758,294 | 7/1988 | Storch | 156/79 |
| 4,923,539 | 5/1990 | Spengler et al. | 264/46.5 |

FOREIGN PATENT DOCUMENTS

| | | |
|---|---|---|
| 0017792 | 10/1980 | European Pat. Off. . |
| 0047038 | 3/1982 | European Pat. Off. . |
| 0309403 | 3/1989 | European Pat. Off. . |
| 0430824 | 6/1991 | European Pat. Off. . |
| 1806433 | 8/1969 | Fed. Rep. of Germany . |
| 366270 | 3/1982 | Fed. Rep. of Germany . |
| 2553669 | 4/1985 | France . |
| 2654670 | 5/1991 | France . |
| 59-145125 | 8/1984 | Japan . |

*Primary Examiner*—Allan R. Kuhns
*Attorney, Agent, or Firm*—Sandler, Greenblum & Bernstein

[57] ABSTRACT

Process of providing on the internal surface of the first and/or second elements of a ski a solid compatibilizer film made of polyurethane or acrylonitrile butadiene styrene or copolyamide. The film forms an interface between foam injected into the internal space of the first and second elements of the ski to promote adherence.

17 Claims, 3 Drawing Sheets

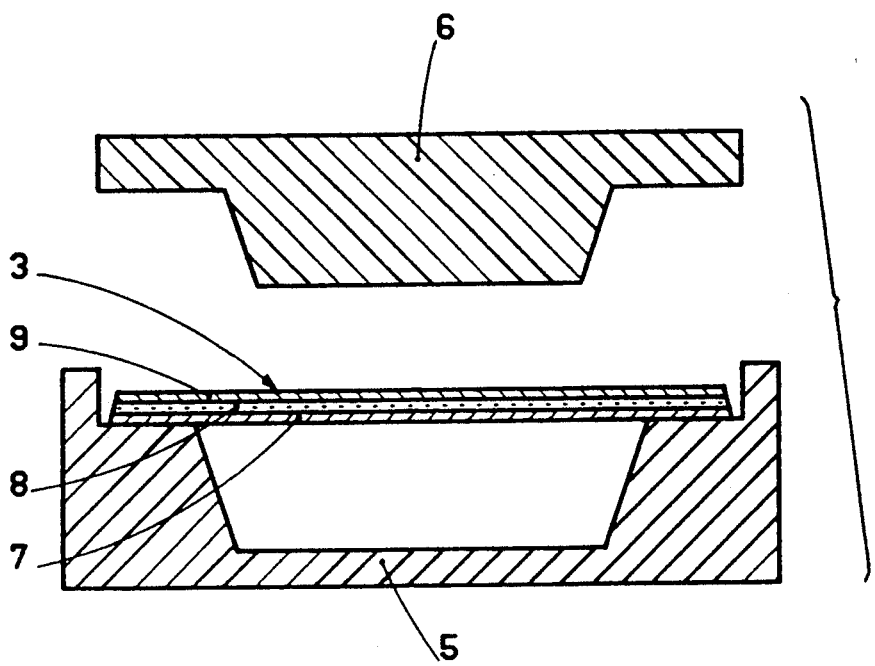
Fig_1
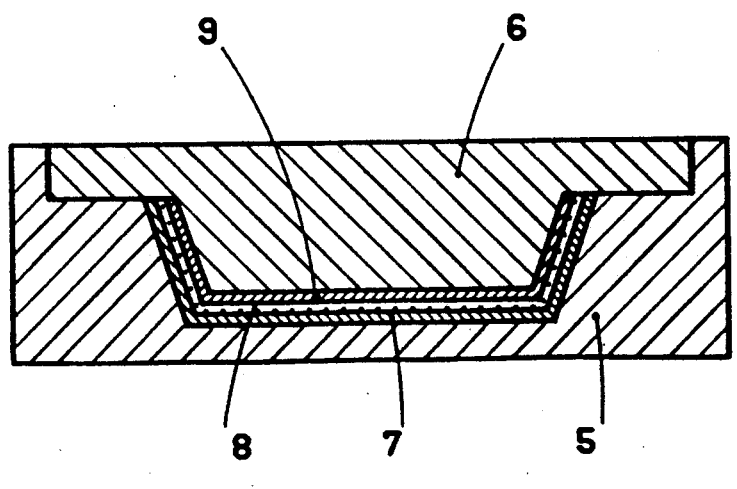
Fig_2

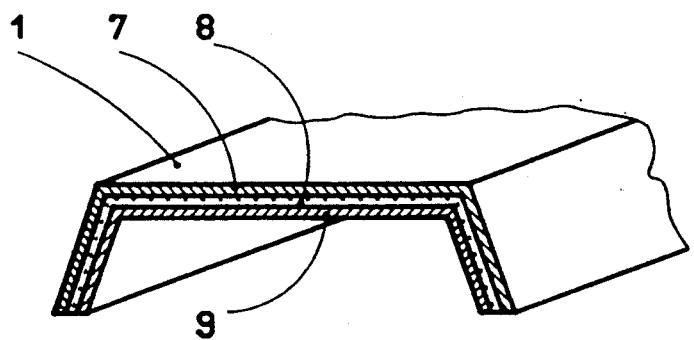
Fig_3
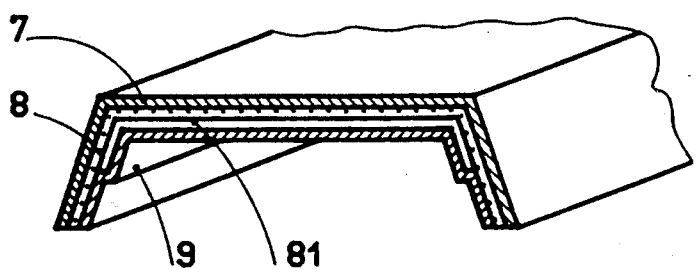
Fig_4
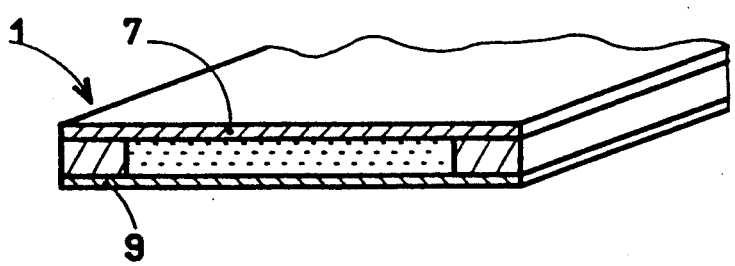
Fig_5
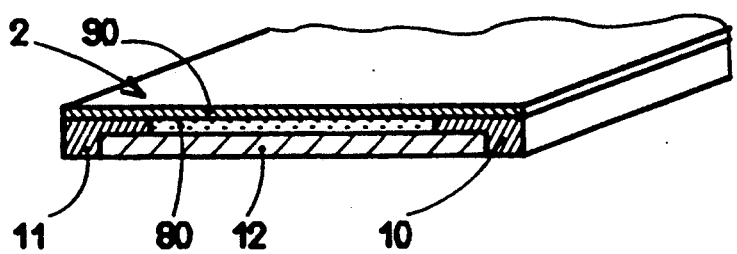
Fig_6

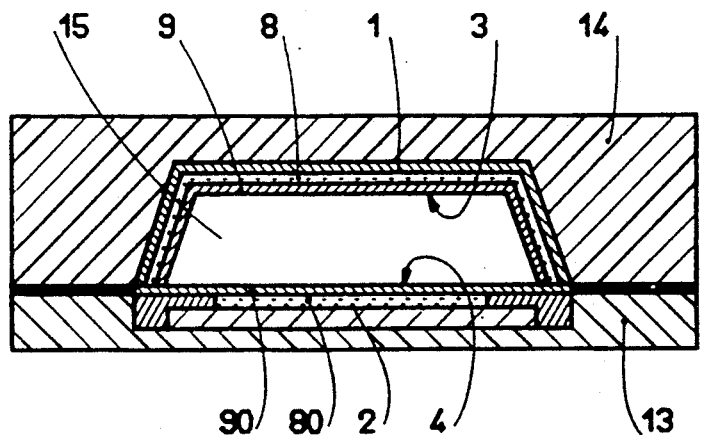
Fig_7
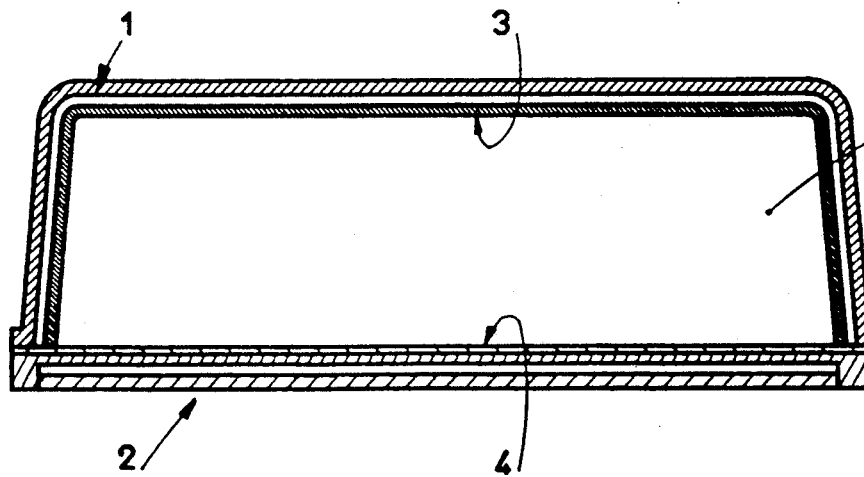
Fig_8
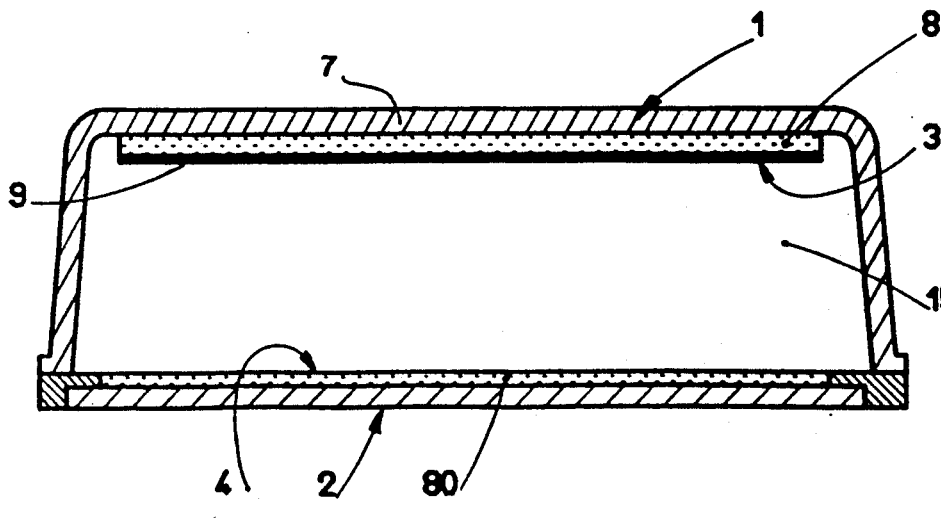
Fig_9

PROCESS OF MANUFACTURING AN INJECTED SKI

BACKGROUND OF THE INVENTION

1. Field of the Invention

The present invention relates to the manufacture of skis utilized in winter sports, which are adapted to slide on snow and ice.

2. Description of Background and Relevant Information

Skis in current use generally have a composite structure in which different material are combined in a manner such that each of the materials functions in an optimal fashion, taking into account the distribution of mechanical stresses. Thus, the structure generally comprises peripheral protection elements forming the upper surface and lateral surfaces of the ski, and internal resistance elements or resistance blades, comprising a material having a high mechanical resistance and high rigidity. The structure likewise comprises filling elements such as cores having a honeycomb structure, a sliding sole forming the lower surface of the ski and ensuring good sliding on snow, and the metallic edges forming the lower corners of the ski.

To obtain the appropriate physical characteristics, the manufacturer of modern skis relies upon very diverse materials. To this end the sliding soles are generally made of polyethylene; the honeycomb cores are made of synthetic foam; the edges are made out of steel; the surfaces of the ski are formed of thermoplastic sheets; and the resistance blades are plates of metal or fiber reinforced resins.

A ski is subjected to severe mechanical stresses, requiring good adherence between the various materials constituting the structure.

In the traditional manufacturing techniques of skis by injection, one positions in the interior cavity of a mold, against the peripheral walls of the cavity, the upper and lower elements of the ski, and, if necessary, the lateral elements, and one injects, in the space thus defined by the internal surfaces of the elements, the components of a hardenable foam such as polyurethane foam or phenolic foam. After expanding and hardening, the foam assures the assembly of the elements.

The difficulty resides in the fact that the hardenable foams have mediocre adherence properties with a certain number of materials adapted to constitute the structure of the ski or have certain incompatibilities with these materials. Particularly, one can constitute the interior mechanical reinforcement elements of the ski, or resistance blades, from layers of fibrous material pre-impregnated with thermosetting or thermoplastic resin, in an advantageous manner. When such a pre-impregnated element forms the interior surface of the space adapted to be filled with hardenable foam, the foam tends to infiltrate across the pre-impregnated fibrous material which produces both a substantial alteration of the mechanical resistance properties of the reinforcement element and adherence defects between the core made out of hardenable foam and the other materials of the ski.

SUMMARY OF THE INVENTION

An object of the present invention, in particular, is to avoid the disadvantages of known processes by providing a novel process of manufacture of an injected ski in which the injected hardenable foam adheres perfectly to the walls of the seat formed by the external elements of the ski between which it is injected.

According to the invention, the injected foam does not adversely affect any of the intrinsic qualities of the other elements constituting the ski.

According to another object of the invention, the process is easy to perform, rapid and economical, and can be automated.

To achieve these objects as well as others, the process according to the invention utilizes, in a known manner, a step of injection of the components of the hardenable foam, followed by the expansion and hardening of the hardenable foam between at least a first element and second element of the ski. According to the invention, the process comprises at least one preliminary step, in the course of which the first element is formed by successively performing the following operations:

(a) providing a solid film or "compatibilizer" having a polymer base having good adhesive properties with the hardenable foam during the succeeding injection step;

(b) providing the first element in the form of a substrate whose internal surfaces are formed of a reinforcement textile sheet pre-impregnated with a thermosetting resin or a thermoplastic resin, or a metallic blade, made out of steel, aluminum alloy, or amorphous metal;

(c) positioning the compatibilizer solid film on the internal surface of the first element to cover the textile reinforcement sheet which has been pre-impregnated, or the metallic blade;

(d) hot forming under pressure the compatibilizer film and the first element to make the film adhere to the first element;

whereby during the ultimate injection step the solid film referred to as a "compatibilizer" constitutes a screen between the hardening foam and the reinforcement, and, after injection and hardening, the foam adheres perfectly to the compatibilizer film and to the first element.

In the present description and in the claims, the term "reinforcement" includes not only pre-impregnated individual sheets of uni-directional parallel threads, but likewise bi-directional threads, fabrics, grids, braids, veils, fabrics, which are not woven and their combinations or substrates of the steel, aluminum or amorphous metal types.

The ski thus obtained has a composite structure comprising at least a first and second element affixed to one another by a core of cellular foam, a film of polymer being positioned at the interface between the cellular foam and at least one of first and second elements, the said element being in contact with the film through a reinforcement layer made of fiber reinforced resin.

BRIEF DESCRIPTION OF THE DRAWINGS

The invention will now be described with reference to certain non-limiting examples of the invention illustrated in the annexed drawings in which:

FIGS. 1 and 2 illustrate the steps of formation of a first element, according to a first embodiment of the invention;

FIGS. 3–5 illustrate three structures of the first upper element of the ski according to the invention;

FIG. 6 illustrates a lower element structure of the ski according to the invention;

FIG. 7 illustrates the step of injection into a mold;

FIG. 8 illustrates a transverse cross-section of a ski structure obtained according to the invention; and FIG. 9 illustrates a transverse cross-section of a ski structure according to another embodiment of the invention.

DESCRIPTION OF PREFERRED EMBODIMENTS

In the embodiments shown in the figures, in FIGS. 8 and 9 for example, the ski according to the invention is constituted by two principal subassemblies, namely, an upper or first element subassembly 1 and a lower subassembly or second element 2, these two elements being connected during the assembly operation of injection of a hardenable foam 15 into the closed space formed by the subassemblies 1 and 2.

The invention comprises positioning in a special manner the interior surface 3 of the first element 1 and/or the interior surface 4 of the second element 2, to render this surface compatible with foam 15. This compatibility causes both a good adherence between the foam 15 and the elements 1 and/or 2, and absence of deterioration of the elements by foam 15.

For this, the structuring of the internal surfaces 3 and/or 4 occurs during manufacture of subassembly 1 and/or 2.

For example, FIGS. 1 and 2 illustrate the formation of a first element 1 or upper subassembly of the ski. In a hot forming mold comprising a lower matrix 5 and an upper punch 6, a plurality of layers adapted to form the first element 1 are positioned. These layers include a plate 7 adapted to form the top of the ski; a layer 8 adapted to form the upper reinforcement of the ski; and a solid compatibilizer film 9 adapted to form the interior surface 3 of first element 1.

Plate 7 is made of thermoplastic materials such as polyurethane, P11, P12, P6 or other polyamides, styrenes of the ABS-SAN or other type, polyolefins of the polyethylene or polypropylene type, polycarbonate, acrylic material, polyester of the PET or PBT type, which may, if desired, be modified.

Layer 8 adapted to form the reinforcement is constituted by a textile reinforcement sheet pre-impregnated with a thermosetting or thermoplastic resin.

A textile reinforcement sheet can particularly be utilized, such sheet having a base of woven fibers or non-woven fibers made of glass, carbon or Kevlar, impregnated with a wet thermosetting resin or partially cross-linked, selected from a group consisting of polyester, epoxydes, and polyurethanes.

Alternatively, a textile reinforcement sheet can be utilized, in which the sheet has a base of woven or non-woven fibers of glass or carbon impregnated with thermoplastic resin selected from a group consisting of polyamides, polycarbonates, and polyether imides (PEI).

The solid compatibilizer film 9 is made of non-expanded polyurethane or ABS (Acrylonitrile Butadiene Styrene) or a copolyamide. It can have a thickness in the range of several microns to several tenths of a millimeter, preferably included between 0.1 and 1 millimeter, and may, if desired, be multilayered.

After positioning the layers 7, 8, and 9 on matrix 5, they are heated and the punch 6 is lowered to close the mold as shown in FIG. 2.

In the case of reinforcement 8, comprising a textile sheet pre-impregnated with a thermosetting resin, the hot pressing operation shown in FIGS. 1 and 2 assures the cross-linking, or the completion of cross-linking of the thermosetting resin, and the adherence of the film 9 on the reinforcement 8. After hardening, first element 1 can be removed from the mold and the ultimate injection operation can then be performed.

In the case a reinforcement textile sheet pre-impregnated with a thermoplastic resin, the operation of hot pressing shown in FIGS. 1 and 2 assures the hot forming of the elements to constitute the first element 1. After cooling, element 1 can be removed from the mold and the ultimate injection operation can be performed.

In the case of a metallic reinforcement the film 9 can preferably be formed by an electrostatic powdering process.

FIGS. 3 and 5 show three embodiments of a first element 1 of a ski. In FIG. 3, the first element 1 corresponds to the formed structure previously shown in FIGS. 1 and 2. Element 1 has the shape of a trapezoidal cross section, having three layers, the exterior layer 7 being adapted to form the top of the ski, the intermediate layer 8 constituting the upper mechanical reinforcement of the ski, the interior layer 9 constituted by the compatibilizer film.

In FIG. 4 the structure is essentially the same as in FIG. 3, the difference being that there is a supplemental internal reinforcement 81 covering the internal surface of the central wall of reinforcement 81 and a portion of the internal surfaces of the lateral walls. In the lower edge zone of reinforcement 81, the film 9 is offset, as shown in FIG. 4 which proves that the film can, in principle, assume any complex shape of the internal surfaces of element 1.

In FIG. 5, element 1 is adapted to form a ski having a sandwich structure and likewise comprises, on its lower surface or internal surface, a solid compatibilizer film 9.

Likewise, as with the first element 1 or upper subassembly of the ski, a compatibilizer film 90 can be provided on the upper surface or internal surface of an element 2 adapted to form the lower subassembly of the ski. FIG. 6 illustrates the structure of such an element 2 comprising the lower edges 10 and 11 made of steel, the lower sole 12 made of polyethylene, and a lower reinforcement element 80. The lower element 2 can likewise be formed by hot pressing or hot forming. The compatibilizer film 90 can be made of polyurethane or copolyamide or ABS. The lower reinforcement element 80 can be formed of a sheet of textile pre-impregnated with thermosetting or thermoplastic resin or from a reinforcement of steel or aluminum or amorphous metal.

After formation of the first and second elements, these first and second elements are positioned in an injection mold as shown in FIG. 7. The injection mold comprises a lower shell 13 and an upper shell 14 forming an internal seat in which the first element 1 and the second element 2 of the ski are inserted. Thus positioned, the first element 1 and the second element form a closed enclosure whose internal surfaces are formed by the internal surface 3 of the first element 1 and the internal surface 4 of the second element 2, such surfaces being formed by the compatibilizer films 9 and 90. Into the interior space the components of a hardenable foam 15 are then injected to fill the interior space. Isocyanates and polyhydrolzylated composites can, for example, be injected so as to prepare a polyurethane foam 15. Alternatively, one can inject the components of a phenolic foam 15. During the injection and expansion of foam 15 in the interior space, the foam 15 comes into contact with films 9 and 90, which constitute a screen between the foam 15 and the reinforcements 8 and 80. Foam 15 adheres perfectly to films 9 and 90.

During the hardening of foam 15, the reaction is generally exothermic. The elevation in temperature which results from this can be utilized to complete the cross-linking of reinforcements 8 and 80, and contributes to reactivate film 9 and 90 to promote the adherence between the film and foam.

If necessary, an additional heat source may be provided from the exterior to heat the assembly for a given duration and to a temperature sufficient to assure a cross-linking and complete gluing of the elements.

The mold can then be separated; and the ski structure is then assembled, for example, as shown in FIG. 8.

FIG. 9 illustrates an alternative embodiment of the present invention in which the upper reinforcement 9 is limited to an upper plate in contact with the top of ski 7. Thus, the film need only cover surface 8 and the foam will adhere on the top sides of ski 7.

This application is related to French Application No. 89.15664, whose priority is claimed, the disclosure and drawings of which is hereby incorporated by reference thereto.

Although the invention has been described with reference to particular means, materials and embodiments, it is to be understood that the invention is not limited to the particulars disclosed and extends to all equivalents within the scope of the claims.

What is claimed is:

1. A process of manufacturing an injected ski comprising the steps of injection of constituents of a hardenable foam, expanding and hardening the hardenable foam, between at least a first element and a second element, said process comprising a preliminary step during which said first element is formed by the following succeeding steps:
    a) providing a solid polymer base film having good adhesion properties with the hardenable foam during the ultimate injection step;
    b) providing said first element in the form of a substrate whose internal surfaces are formed by a reinforcement, said reinforcement comprising a member selected from the group consisting of: (1) a textile reinforcement sheet pre-impregnated with a member selected from the group consisting of: thermosetting resin and thermoplastic resin, and (2) a metallic reinforcement;
    c) positioning said solid film on said internal surface of said first element to cover said reinforcement;
    d) hot forming under pressure said solid film and said first element, after said step of positioning said solid film on said internal surface of said first element, to make said film adhere to said first element; and
whereby during said injection step said solid film constitutes a screen between the hardenable foam and the reinforcement and, after injection and hardening said foam adheres perfectly to said film.

2. The process as defined by claim 1, wherein said textile reinforcement sheet is pre-impregnated with a moist thermosetting resin or partially cross-linked thermosetting resin selected from the group consisting of polyesters, epoxides and polyurethanes.

3. The process as defined by claim 2, wherein the textile sheet reinforcement has a base of woven or non-woven fibers made of glass, carbon or Kevlar.

4. The process as defined by claim 1, wherein the textile reinforcement sheet is pre-impregnated with a thermoplastic resin selected from the group consisting of: polyamides, polycarbonates, and polyether imides.

5. The process as defined by claim 1, wherein the metallic reinforcement is metal selected from the group consisting of steel, aluminum alloy and amorphous metal.

6. The process as defined by claim 4, wherein the textile reinforcement sheet has a base of woven or non-woven fibers made of glass or carbon.

7. The process as defined by claim 1, wherein a solid film is provided on the internal surfaces of both said first and second elements.

8. The process as defined by claim 1, wherein the solid film is made of polyurethane.

9. The process as defined by claim 1, wherein the solid film is made of acrylonitrile butadiene styrene.

10. The process as defined by claim 1, wherein the solid film is a copolyamide.

11. The process as defined by claim 1, wherein the film is multi-layered.

12. The process as defined by claim 1, wherein the solid film has a thickness between 0.1 and 1 millimeter.

13. The process of claim 1, further comprising the steps of:
    said second element comprising a lower ski element, said first element comprising an upper ski element;
    wherein said step of hot forming under pressure further comprises the step of placing said second element in said mold, whereby said first element and said second element form a closed enclosure whose internal surfaces are formed by internal surfaces of the first element and second element; and
    wherein said step of injecting comprises injecting said hardenable foam into said closed enclosure.

14. A process of manufacturing a ski comprising the steps of:
    a) providing a solid polymer film having good adhesion properties with a hardenable foam;
    b) providing a first element in the form of a substrate having an internal surface formed by a reinforcement, said reinforcement comprising a textile reinforcement sheet pre-impregnated with a thermosetting resin;
    c) positioning said solid polymer film on said internal surface of said first element to cover said reinforcement;
    d) placing said film and said first element in a mold;
    e) closing said mold and hot forming under pressure said film and said first element to make said film adhere to said first element; and
    f) injecting said hardenable foam into said mold, whereby said solid film screens the hardenable foam from the reinforcement and said foam, after injection and hardening, adheres securely to said solid film.

15. A process of claim 14, further comprising the steps of:
    providing a second element, said second element comprising a lower ski element, said first element comprising an upper ski element;
    wherein said step of placing said film and said first element in a mold further comprises the step of placing said second element in said mold, whereby said first element and said second element form a closed enclosure whose internal surfaces are formed by internal surfaces of the first element and second element; and wherein said step of injecting comprises injecting said hardenable foam into said closed enclosure.

16. A process of manufacturing a ski comprising the steps of:
   a) providing a solid polymer film having good adhesion properties with a hardenable foam;
   b) providing a first element in the form of a substrate having an internal surface formed by a reinforcement, said reinforcement comprising a metallic reinforcement;
   c) positioning said solid polymer film on said internal surface of said first element to cover said reinforcement;
   d) placing said film and said first element in a mold;
   e) closing said mold and hot forming under pressure said film and said first element to make said film adhere to said first element; and
   f) injecting said hardenable foam into said mold, whereby said solid film screens the hardenable foam from the reinforcement and said foam, after injection and hardening, adheres securely to said solid film.

17. The process of claim 16, further comprising the steps of:
   providing a second element, said second element comprising a lower ski element, said first element comprising an upper ski element;
   wherein said step of placing said film and said first element in a mold further comprises the step of placing said second element in said mold, whereby said first element and said second element form a closed enclosure whose internal surfaces are formed by internal surfaces of the first element and second element; and
   wherein said step of injecting comprises injecting said hardenable foam into said closed enclosure.

* * * * *